3,733,207
PREPARATION OF A SOY PROTEIN FRACTION
Edward M. McCabe, Marysville, Ohio, assignor to Societe d'Assistance Technique pour Produits Nestle S.A., Lausanne, Switzerland
No Drawing. Filed July 14, 1971, Ser. No. 162,654
Int. Cl. A23j *1/14;* A23l *1/00, 1/20*
U.S. Cl. 99—17                  6 Claims

ABSTRACT OF THE DISCLOSURE

A protein fraction particularly suitable for incorporation in carbonated beverages is recovered from soy protein, by reaction of the soy with phytase, removal of matter insoluble at a pH of about 4.6 and recovery of the fraction insoluble at pH of about 5.0 to 5.4.

---

This invention is concerned with the preparation of a soluble soy protein fraction.

Because of their relative abundance and comparatively low price, there is an increasing interest in soy beans as a source of edible protein for human nutrition. Various high protein compositions based on soy have been proposed in the literature, and soy-milk beverages are also known. These latter, however, are opaque, as the soy protein does not give a clear solution in water. Furthermore, soy protein precipitates at low pH values and it has therefore not been practical to incorporate it in carbonated beverages, as these require a pH of not more than 4.

An object of the invention is therefore to provide a soy protein fraction which is completely soluble at relatively low pH values, giving a clear, colourless solution.

Another object is to provide novel food and beverage compositions containing a soluble soy protein fraction.

In accordance with the invention, a soluble fraction is obtained from soy protein by a process which comprises the enzymatic degradation of the phytin, followed by isolation of a particular fraction soluble at pH values below 5.2, preferably below 4.6.

Most conveniently, the starting material is a soy protein isolate, such isolates generally containing at least about 90% protein and being soluble in alkali. However, both soy protein concentrates and even soy flour (desirably low-heat treated) may be used.

For the enzymatic reaction, the soy protein starting material (isolate, soy flour or meal) may first be suspended in water or dilute alkali, for example at pH 7.0 to 8.5. The solids concentration should desirably not exceed about 15% by weight as at higher levels the solutions become very viscous and hence less easy to handle. An acid is then added to adjust the pH value of the suspension to about 4.6 to 6.0. Whilst the enzyme is most active at a pH of 5.0 to 5.5, it is preferred to work at pH values of about 5.5 to 6.0 as in this range a greater proportion of the protein present is dissolved. Phytase is then added, preferably in an amount corresponding to 0.01% by weight of the protein present, and enzymic reaction is desirably carried out at 50 to 55° C., this being the temperature of optimum activity of the enzyme. The reaction time should be sufficient to secure breakdown of substantially all the phosphate linkages present in the protein. Depending on the activity and purity of the enzyme, as well as the reaction conditions, the total time may be up to about 36 hours.

Thereafter, the pH of the reaction mixture is adjusted to a value of about 4.6, and the resultant precipitate, containing unreacted material, is separated as by filtration or centrifugation. Hydrochloric acid is preferred for pH adjustment, but any other non-toxic acid may also be used.

The pH of the recovered clear solution is then adjusted to a value of about 5.0 to 5.4, preferably about 5.2. A precipitate is again formed, and it may be recovered as previously. This precipitate consists of the protein fraction soluble at low pH values (below 4.6), and it may be formulated in various edible compositions. It is particularly suitable for incorporation in beverages such as soft drinks which may be carbonated, for example at a level of about 2.0 to 2.5% by weight.

The desired protein fraction may be further purified by washing, molecular sieving or gel filtration to remove traces of salts formed during the process and to eliminate off flavours. The product has a bland flavour and is soluble in water as acidic solutions at pH values below 4.6.

The invention is further illustrated by the following examples, in which the parts are by weight.

EXAMPLE 1

10 parts of soy protein isolate are dissolved in 100 parts of water to which sufficient sodium hydroxide has been added to raise the pH to about 8.

Hydrochloric acid is then added to lower the pH to 6 and 0.1 part of a phytase-containing preparation (obtained from wheat meal by the method described by F. G. Peers, Biochem. J., 53, 102 (1953)) are added. The temperature is maintained at 50 to 55° C. for 24 hours, which is generally sufficient for the phytase to break down the phosphate linkages in the protein.

Upon completion of the reaction the pH of the medium is adjusted to 4.6 by addition of hydrochloric acid. The resultant precipitate is removed by centrifugation and discarded, whereas sodium hydroxide is added to the supernatant to raise the pH to 5.2 where a precipitation occurs.

The precipitate thus formed, consisting of the protein fraction soluble at pH values of 4.6 and below, is recovered. It may be further purified by washing, reprecipitation or gel filtration to remove traces of salts formed during neutralisation. The protein fraction may also be dried, giving a white powder with a bland taste, which is suitable for incorporation in different foods and beverages.

EXAMPLE 2

A lemon/lime flavoured soft drink is prepared from the following ingredients:

| | Parts |
|---|---|
| Sugar | 10.0 |
| Protein fraction of Example 1 | 2.0 |
| Citric acid | 0.1 |
| Sodium benzoate | 0.05 |
| Lemon/lime flavour | 0.05 |

Carbonated water to give 100 parts.

The resulting beverage (pH 2.8) is clear and has an excellent mouth feel, with no beany or "paint" soy flavour.

EXAMPLE 3

A cola-flavoured soft drink is prepared from:

| | Parts |
|---|---|
| Sugar | 9.0 |
| Protein fraction of Example 1 | 2.5 |
| Phosphoric acid | 0.15 |
| Sodium benzoate | 0.05 |
| Cola flavour | 0.05 |
| Colouring | Trace |

Carbonated water to give 100 parts.

The resulting beverage (pH 2.6) has excellent mouth feel and no off-flavour associated with soy beans.

EXAMPLE 4

A still beverage (pH 4.5) with added vitamins and minerals is prepared from the following ingredients:

| | Parts |
|---|---|
| Sugar | 10.0 |
| Protein fraction of Example 1 | 2.0 |
| Lemon/lime flavour | 0.05 |
| Sodium benzoate | 0.05 |
| Colouring | Trace |

Water to give 100 parts.

The following quantities of vitamins and minerals are then added to each 100 ml. of the prepared beverage:

Vitamins:
| | | |
|---|---|---|
| $B_1$ | mg | 0.3 |
| $B_2$ | mg | 0.4 |
| $B_6$ | mg | 0.5 |
| $B_{12}$ | mcg | 0.8 |
| Niacin | mg | 3.0 |
| Potassium iodide | mg | 1.0 |
| Calcium (as calcium phosphate) | mg | 15.0 |
| Phosphorus (as calcium phosphate) | mg | 15.0 |
| Iron (as ferric ammonium citrate) | mg | 1.0 |

I claim:

1. A process for isolating a soluble protein fraction from phytin-containing soy protein materials, comprising adding said materials to an aqueous medium, degrading the phytin in said material with a phytase at a temperature and for a period of time sufficient to secure breakdown of substantially all the phosphate linkages present in the protein, adjusting the pH of the medium to about 4.6 to form an insoluble precipitate and recovering a protein solution, adjusting the pH of the protein solution to about 5.0 to 5.4 to precipitate a protein fraction and recovering the precipitated protein fraction.

2. A process according to claim 1 in which the soy protein material is added to the aqueous medium by suspending it in water at a pH of about 7.0 to about 8.5.

3. A process according to claim 2 in which the degradation of the phytin with the phytase is effected at a pH of about 5.5 to about 6.0 and a temperature of about 50 to 55° C.

4. A process according to claim 3 in which the pH of the protein in solution is adjusted to about 5.2.

5. A process according to claim 1 in which the degradation of the phytin with the phytase is effected at a pH of about 4.6 to 6.0.

6. A process according to claim 5 in which the pH of the protein in solution is adjusted to about 5.2.

References Cited

Markley, Klare: "Soybeans and Soybean Products," vol. I, Interscience Publishers Inc. New York, 1951, pp. 361, 415 and 416.

RAYMOND N. JONES, Primary Examiner

W. A. SIMONS, Assistant Examiner

U.S. Cl. X.R.

99—28, 79; 195—4, 29